F. L. BAILEY AND J. H. LA GRANT.
SECTIONAL TIRE FILLER.
APPLICATION FILED MAR. 25, 1919.
1,322,281. Patented Nov. 18, 1919.
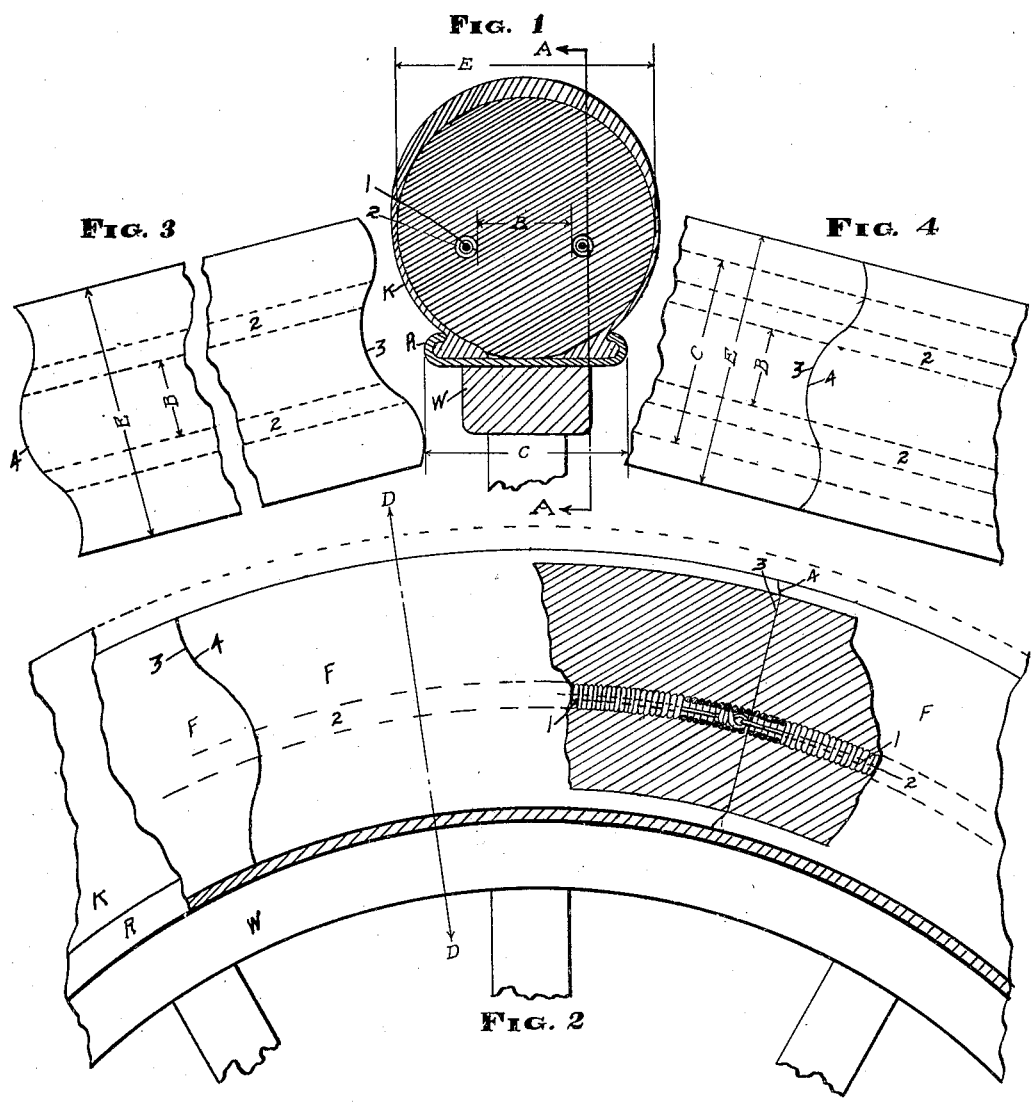

UNITED STATES PATENT OFFICE.

FRED L. BAILEY AND JOHN H. LA GRANT, OF WICHITA, KANSAS.

SECTIONAL TIRE-FILLER.

1,322,281.  Specification of Letters Patent.  Patented Nov. 18, 1919.

Application filed March 25, 1919. Serial No. 284,949.

*To all whom it may concern:*

Be it known that we, FRED L. BAILEY and JOHN H. LA GRANT, citizens of the United States, and residents of Wichita, in the county of Sedgwick and State of Kansas, have invented certain new and useful Improvements in Sectional Tire-Fillers, of which the following is a description, referring to the accompanying drawings, which form a part of this specification.

The object of the invention is to provide suitable unit sections of elastic composition adapted to be used in combination as a filling for tire casings in automobile and kindred uses and to the various means for connecting and fabrication thereof.

In the drawings Figure 1 represents a cross sectional view of the rim on an automobile wheel, a casing in place thereon and our tire filler within said casing. Fig. 2 is a side elevation of said combination, with a portion thereof shown in section for convenience of description. Fig. 3 is a top view of a fragmentary portion of the tire filler. Fig. 4 is a top view of a fragmentary portion of the tire filler showing abutting sectional units.

Similar numerals of reference indicate corresponding parts in all the figures of the drawings. Referring to the drawings, W represents an automobile wheel. R is its steel rim and K is the outer casing of the tire engaged between the flanges of the rim R, spaced apart as seen at C in Figs. 1 and 4. Fig. 1 is a sectional view of the wheel and tire parts taken along the line D—D in Fig. 2. Within the walls of the casing K is seen our elastic tire filler comprising a series of short sectional units F, F, F, etc., each of width equivalent to the inner diameter E of the casing K and bound to one another by means of wires 1, 1. In Figs. 1, 3 and 4, separated at a distance B, are seen conduits 2, 2 embedded within the sectional units F. Each conduit 2 comprises a spirally wound wire through which a binding wire 1 is passed. In the manufacture of a sectional unit F, rods are passed through the conduits said rods connecting to the chuck disk and tail support in a lathe, so that the section may be revolved for accurate size manufacturing purposes. The conduits also serve to reinforce the body of the section F so as to hold it in a relative position during such manufacture and during the process of introduction within the tire casing.

The ends of each sectional part F are corrugated and arranged so that abutting ends of adjacent sectional parts register as at 3 and 4 to aline the conduits and permit the binding wires to be readily drown through in assemblage. The wires 1, 1 are shown connected together in the sectional view Fig. 2 taken along the line A—A Fig. 1 looking in the direction of the arrows. Threaded union sleeves, turnbuckles or other means may be employed for this purpose so as to firmly bind the sectional filler parts F to the rim of the wheel. In the assemblage of the sectional units, special tools are employed which grasp the opposite ends of the wires 1 and their connections and spread the adjacent sectional units apart to permit of proper end locking of such wire elements, the tools being removed, the sectional units expand to a contact. The assembled units are then forced within a tire casing and by means of proper tools the casing with contained sectional units is then engaged within the rim of the wheel where the parts are held locked by the tendency of the tire to expand against said rim.

Such modifications may be employed as lie within the scope of the appended claims.

Having fully described our invention what we now claim as new and desire to secure by Letters Patent is:

1. A tire filling unit comprising a longitudinally extending elastic element having a plurality of spirally wound wire conduits incorporated therein and through which members are adapted to be passed.

2. A tire filling unit comprising a longitudinally extending elastic body section having flexible metallic conduits longitudinally incorporated therein through which members are adapted to be passed.

3. A tire filling unit comprising a longitudinally extending elastic body section having metallic conduits longitudinally incorporated therein, the ends of said unit being corrugated.

4. In a tire casing, a filler comprising a series of abutting sectional units, each unit comprising a longitudinally extending elastic body section, entirely filling a unit area of said casing and having paired flexible metallic conduits longitudinally extending through said elastic body, in such manner, that the paired conduits of one section abut the paired conduits of adjacent sections and means passing through each series of said abutting conduits for binding said body sections in contacting consecutive relationship.

5. In a tire casing, a filler comprising a series of abutting sectional units, each unit comprising a longitudinally extending elastic body section, provided with corrugated ends, entirely filling a unit area of said casing and having paired flexible metallic conduits longitudinally extending through said elastic body; the corrugated ends of abutting sections registering and occasioning the registering of the paired conduits of said abutting sections and means passing through each series of said abutting conduits and binding the assembled sectional units into an integral tire filler.

FRED L. BAILEY.
JOHN H. LA GRANT.

Witnesses:
R. W. ESTEP,
CHARLES S. THACHER.